United States Patent
Schellhase

(10) Patent No.: US 6,220,803 B1
(45) Date of Patent: Apr. 24, 2001

(54) SELF-LOCKING AND SELF-RETAINED STRUCTURAL FASTENER

(75) Inventor: Ernst Calvin Schellhase, Fort Worth, TX (US)

(73) Assignee: Bell Helicopter TEXTRON Inc., Fort Worth, TX (US)

( * ) Notice: Subject to any disclaimer, the term of this patent is extended or adjusted under 35 U.S.C. 154(b) by 0 days.

(21) Appl. No.: 09/546,842

(22) Filed: Apr. 11, 2000

(51) Int. Cl.[7] ........................................ F16B 39/00
(52) U.S. Cl. ........................ 411/107; 411/352; 411/114; 411/999; 411/951
(58) Field of Search ................................ 411/105, 107, 411/111, 114, 115, 326, 329, 352, 353, 949, 950, 951, 965, 999

(56) References Cited

U.S. PATENT DOCUMENTS

| | | |
|---|---|---|
| 2,742,072 * | 4/1956 | Murphy . |
| 2,756,796 * | 7/1956 | Murphy . |
| 2,992,685 * | 7/1961 | Madsen . |
| 3,683,988 | 8/1972 | Carter et al. . |
| 4,822,227 | 4/1989 | Duran ................... 411/373 |
| 4,906,153 | 3/1990 | Duran ................... 411/353 |
| 5,333,978 | 8/1994 | Rives ................... 411/389 |
| 5,632,584 | 5/1997 | Acevedo ................ 411/182 |
| 6,010,289 | 1/2000 | DeStasio et al. ......... 411/174 |
| 6,095,736 * | 8/2000 | Miller . |

* cited by examiner

Primary Examiner—Flemming Saether
(74) Attorney, Agent, or Firm—Gardere Wynne Sewell LL; Sanford E. Warren, Jr.

(57) ABSTRACT

A self-lock and self-retained structural fastener assembly (10) is disclosed. The fastener assembly (10) comprises a plate member (12) having an opening (14) and a pair of receivers (16, 18). A retainer (20) that has a threaded opening (22), a pair of oppositely disposed spring fingers (24, 26) and a pair of oppositely disposed hooks (28, 30) is coupled to the plate member (12) by lockably inserting the hooks (28, 30) within the receivers (16, 18) of the plate member (12) to form a fastener housing (32). A stud (34) is rotatably positioned within the fastener housing (32). The stud (34) has a boss (36) and first and second threaded sections (38, 40) extending in opposite directions from the boss (36). The stud (34) has an uninstalled position wherein the first threaded section (38) is threadably engaged with the threaded opening (22) of the retainer (20). The stud (34) also has an installed position wherein the second threaded section (40) extends outwardly through the opening (14) of the plate member (12) and the boss (36) is locked between the spring fingers (24, 26).

20 Claims, 2 Drawing Sheets

SELF-LOCKING AND SELF-RETAINED STRUCTURAL FASTENER

TECHNICAL FIELD OF THE INVENTION

This invention relates in general to the field of fastening devices and, in particular to, a self-locking, self-retained, structural fastening device that may be used to secure two panels together.

BACKGROUND OF THE INVENTION

Without limiting the scope of the invention, its background will be described with reference to securing two aircraft panels together with a fastener as an example.

Aircraft fasteners are available in a variety of configurations to serve in many different applications including securing two panels together. These fasteners are subjected to environmental conditions that are far more severe than ordinary fasteners. The fasteners must endure conditions that include extreme temperature variations, constant operational vibration, and substantial static and dynamic loading. Component failure in these harsh environments could be disastrous for the crew and passengers. Significant equipment losses may also result from component failure. Aircraft fasteners, consequently, must be designed to perform reliably under many adverse conditions.

One typical fastener used for securing two panels together for an aircraft is the rivet. In certain application, however, it becomes necessary to be able to remove or disconnect the fastener from the structure. In such cases, a convention removable fastener, such as a bolt or stud could be used. In certain applications, however, it is desirable to mount the bulk of the structural fastener toward the interior of a structure being connected. In addition, it may be desirable to mount a fastener such that the exterior surface of the fastener is flush with the exterior surface of the structure being fastened or connected. Also, it is desirable prevent damage to other components in the event of a fastener failure.

Therefore a need has arisen for a structural fastener that is capably of securing two panels together that can withstand high vibrations and extreme outside influences that would cause ordinary fasteners to eventually loosen and disengage. A need has also arisen for such a structural fastener that can mounted toward the interior of a structure being connected. Further, a need has arisen for such a structural fastener that may be mounted such that the exterior surface of the fastener is flush with the exterior surface of the structure being fastened or connected. Additional, a need has arisen for such a structural fastener that does not damage other components in the event of a fastener failure.

SUMMARY OF THE INVENTION

The present invention disclosed herein comprises a structural fastener assembly that is capably of securing two panels together that is locked in position to prevent rotation when the fastener is securing two panels together. The self-locking structural fastener assembly of the present invention may be mounted toward the interior of a structure being connected and may be mounted such that the exterior surface of the fastener is flush with the exterior surface of the structure being fastened or connected. In the event of failure of the self-locking structural fastener assembly of the present invention, the threaded stud thereof is retained within the fastener housing to enhance safety. As such, the present invention disclosed herein comprises a self-locking, self-retained structural fastener assembly that may couple two panels together.

The fastener assembly of the present invention comprises a plate member that is secured to the first panel. The plate member has an opening and a pair of receivers. The fastener assembly also comprises a retainer having a threaded opening, a pair of oppositely disposed spring fingers and a pair of oppositely disposed hooks. The hooks are lockably insertable within the receivers of the plate member to form a fastener housing. A stud having a boss and first and second threaded sections extending in opposite directions from the boss is rotatably positioned within the fastener housing. The stud has an uninstalled position and an installed position. In the uninstalled position, the first threaded section is threadably engaged with the threaded opening of the retainer. In the installed position, the second threaded section extends outwardly through the opening of the plate member into a nut secured to the second panel. Also, in the installed position, the boss is locked between the spring fingers to prevent unwanted rotation of the stud. In this manner, the first and second panels are secured together.

In one embodiment, the spring fingers of the retainer are angled such that the distance between the spring fingers proximate the plate member is less than the distance between the spring fingers proximate the threaded opening of the retainer. In another embodiment, the spring fingers of the retainer have detents on their distal ends. In either embodiment, the spring finger may be located within channels of the boss to lock the stud in the installed position.

In one embodiment, the stud may include an unthreaded section that extends beyond first threaded section which is disposed within the threaded opening of the retainer when the stud is in the installed position. The stud may be a hollow and may have a tool receiving pattern cut internally therein proximate the end of the second threaded section such that a tool may be inserted therein to rotate the stud.

In the method of the present invention, two panels are secured together using the fastener assembly. The method comprises securing a nut to the first panel and securing a plate member, having an opening and a pair of receivers, to the second panel. A retainer having a threaded opening, a pair of oppositely disposed spring fingers and a pair of oppositely disposed hooks is coupled to the plate member by lockably inserting the hooks within the receivers of the plate member to form a fastener housing. A stud that is rotatably positioning within the fastener housing may then be rotated from an uninstalled position wherein a first threaded section is threadably engaged with the threaded opening of the retainer to an installed position wherein a second threaded section extends outwardly through the opening of the plate member into the nut and a boss is locked between the spring fingers, thereby securing two panels together.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
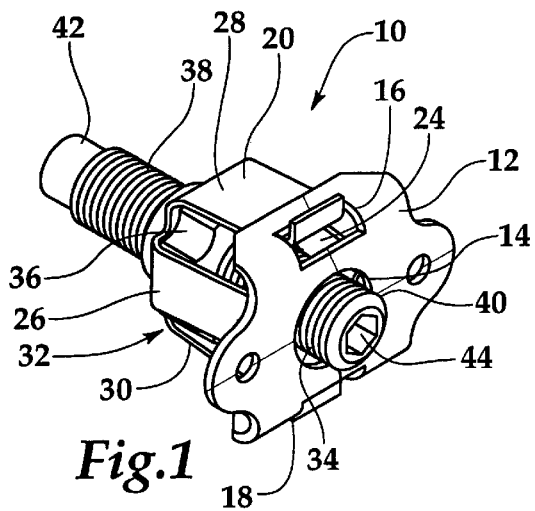
FIG. 1 is a perspective view of a self-locking, self-retained structural fastener of the present invention in an uninstalled position.

Referring to FIG. 1, therein is depicted a self-locking, self-retained structural fastener assembly of the present invention that is generally designated 10. Fastener assembly 10 includes a plate member 12. Plate member 12 has an opening 14 and a pair of receivers 16, 18. Fastener assembly 10 also includes a retainer 20. Retainer 20 has a threaded opening 22, a pair of oppositely disposed spring fingers 24, 26 and a pair of oppositely disposed hooks 28, 30. Hooks 28, 30 lockingly engage receivers 16, 18 of plate member 12 respectively. Together, plate member 12 and retainer 20 form a fastener housing 32.

Figure 2:
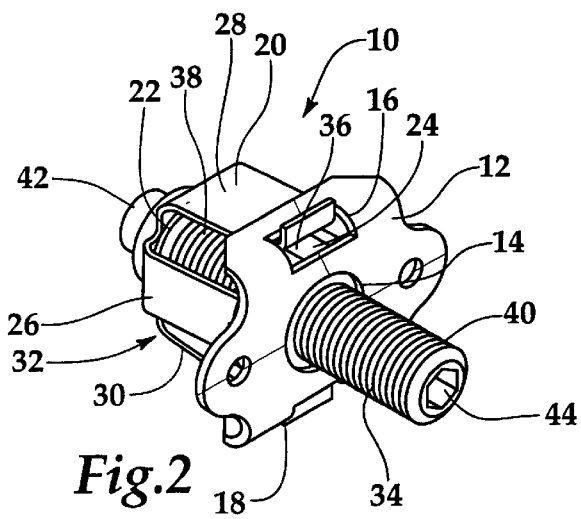
FIG. 2 is a perspective view of a self-locking, self-retained structural fastener of the present invention in an installed position.

A stud 34 is rotatably positioned within fastener housing 32. Stud 34 has a boss 36 and a pair of oppositely extending threaded sections 38, 40. Stud 34 also includes an unthreaded section 42. Stud 34 may be formed from a hollow tube and includes a tool receiving pattern 44, such as an Allen socket cut internally therein at the end of stud 34 including threaded section 40 for receiving a tool such as an Allen wrench that rotates stud 34. Likewise, a tool receiving pattern (not shown) may be located at the end of stud 34 including unthreaded section 42. As best seen in FIG. 1, stud 34 has an uninstalled position wherein threaded section 38 is threadably engaged with threaded opening 22 of retainer 20. As best seen in FIG. 2, stud 34 has an installed position wherein threaded section 40 extends outwardly through opening 14 of plate member 12. In this installed position, boss 36 is locked between spring fingers 24, 26, thereby preventing unwanted rotation of stud 34 and locking stud 34 in the installed position.

Figure 3:
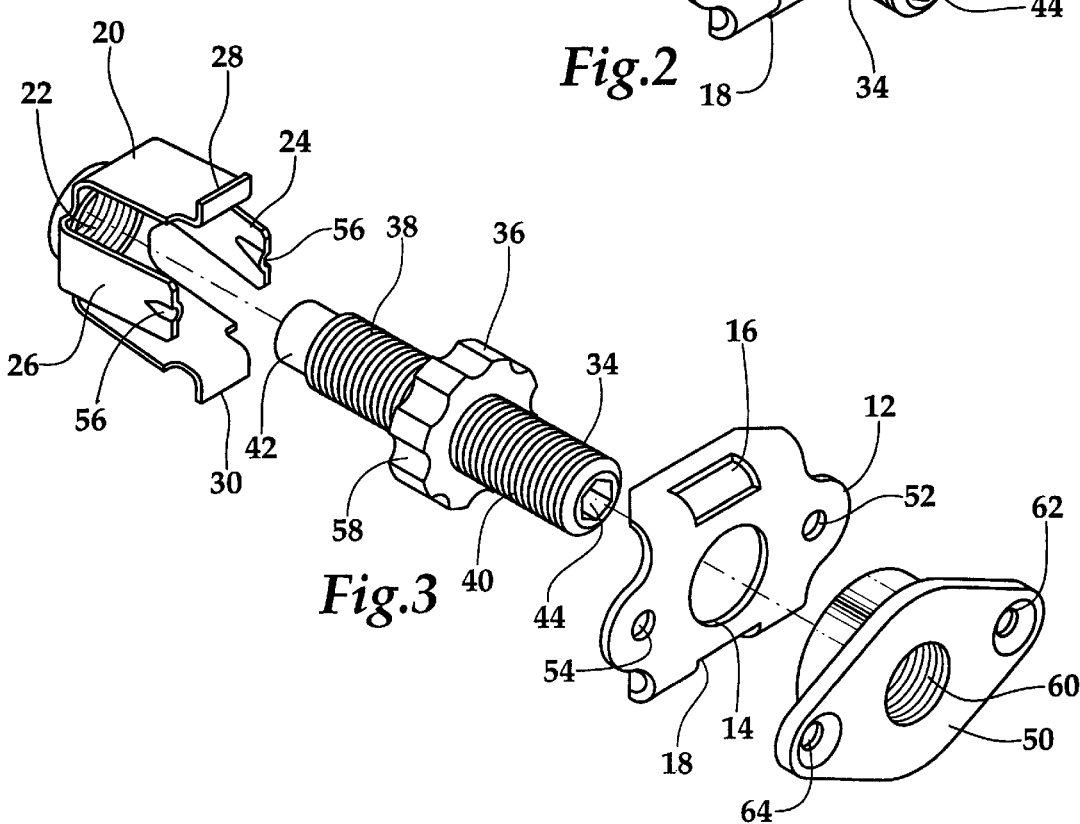
FIG. 3 is an exploded view of a self-locking, self-retained structural fastener of the present invention.

Referring now to FIG. 3, fastener assembly 10 is depicted in an exploded view relative to a nut 50. Fastener assembly 10 includes plate member 12. Plate member 12 includes opening 14. Plate member 12 has bent sections disposed on opposites sides thereof. Receivers 16, 18 are cut in the corner of the bent sections. Plate member 12 also has a pair of rivet holes 52, 54.

Fastener assembly 10 also includes retainer 20. Retainer 20 has threaded opening 22 and spring fingers 24, 26. Spring fingers 24, 26 each has a detent 56. Spring fingers 24, 26 are angled toward one another such that the distance between spring fingers 24, 26 proximate detents 56 is less than the distance between spring fingers 24, 26 proximate threaded opening 22. Retainer 20 also includes hooks 28, 30 which terminate in bent sections that are lockably insertable into receivers 16, 18 of plate member 12.

Fastener assembly 10 includes stud 34. Stud 34 has boss 36 which has channels 58 cut therein. Stud 34 includes threaded section 38, threaded section 40 and unthreaded section 42. Stud 34 has a pair of tool receiving patterns on either end thereof including tool receiving pattern 44, such as an Allen socket cut internally therein for receiving a tool such as an Allen wrench for rotating stud 34.

Nut 50 has a central threaded opening 60 that threadably receives threaded section 40 of stud 34 when stud 34 is in the installed position. Nut 50 also includes rivet holes 62, 64 that may be used for attaching nut 50 to a panel. Nut 50 may include a locking mechanism such as internal locking threads which provide additional protection against unwanted rotation of stud 34.

Figure 4:
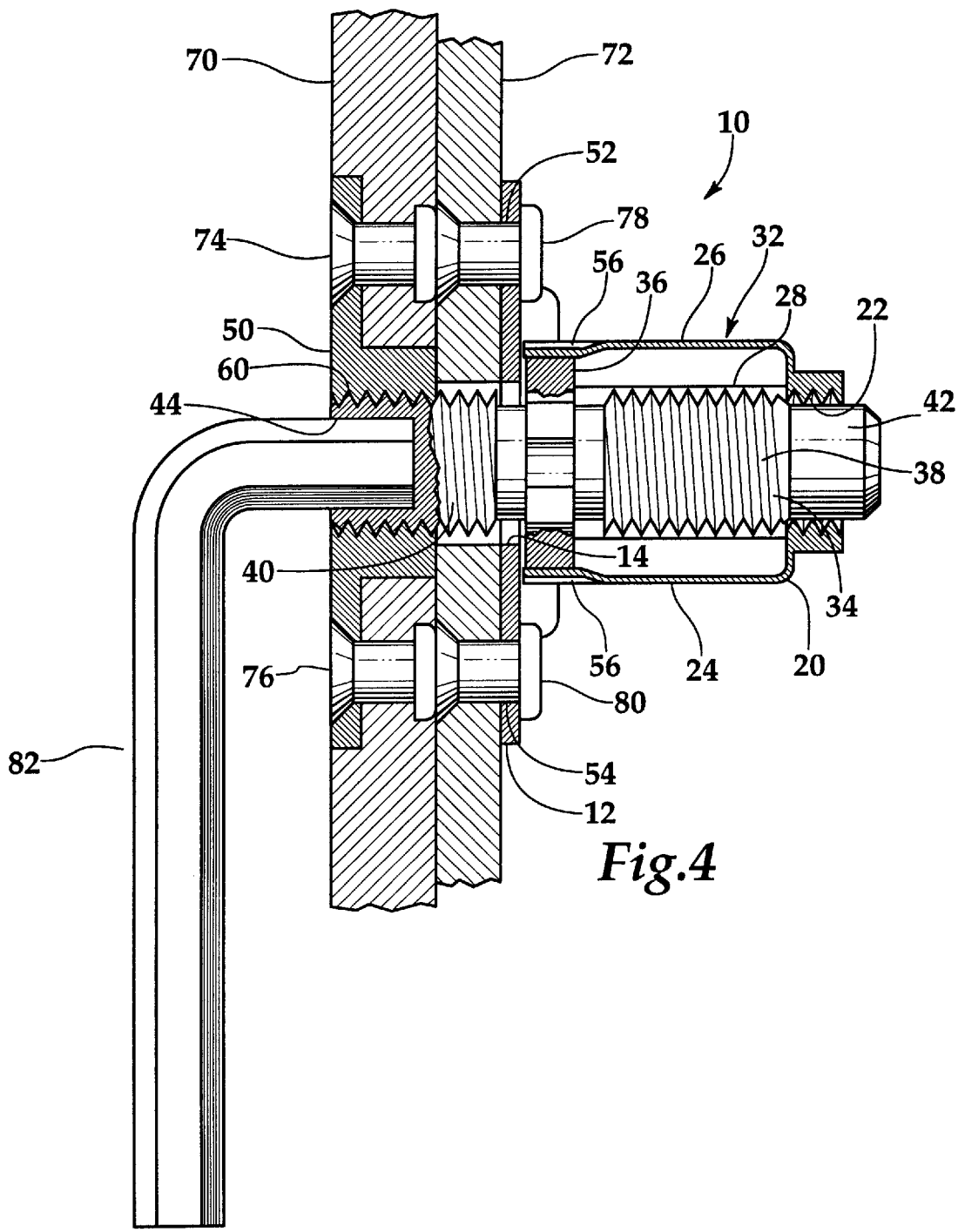
FIG. 4 is a cross sectional view of a self-locking, self-retained structural fastener of the present invention securing two panels together.

In operation, fastener 10 may be used to secure an outer panel 70 to an inner panel 72, as best seen in FIG. 4. An example of the use of fastener 10 is for securing a spinner cone assembly, the outer panel, to an upper spoke assembly, the inner panel, of a proprotor of a tiltrotor aircraft. Fastener assembly 10 of the present invention provides a smooth outer surface and at the same time positively secures outer panel 70 to inner panel 72. The smooth outer surface is provided by recessing nut 50 in an appropriately sized opening in outer panel 70. Nut 50 may be secured to outer panel 70 by mechanical means such as rivets 74, 76. Alternatively, nut 50 may be entirely eliminated by drilling and internally threading a hole in outer panel 70.

Fastener assembly 10 is secured to inner panel 72 by rivets 78, 80 disposed within rivet holes 52, 54 thereby connecting plate member 12 to inner panel 72. When retainer 20 is connected to plate member 12 by inserting hooks 28, 30 within receivers 14, 16, a fastener housing 32 is formed. Stud 34 is retained within fastener housing 32 and is rotatable therein using Allen wrench 82 that is inserted into tool receiving pattern 44 or into a similar tool receiving pattern on the opposite end of stud 34. Operating stud 34 from the uninstalled position to the installed position involves rotating stud 34 counter clockwise within fastener housing 32 such that threaded section 38 rotates within threaded opening 22 of retainer 20. As stud 34 travels axially toward nut 50, boss 36 begins to contact spring fingers 24, 26 as the distance between spring finger 24, 26 reduces near plate member 12. At the same time, threaded section 40 extends outwardly from plate member 12 toward threaded opening 60 of nut 50. Once threaded section 40 contacts threaded opening 60, threaded section 40 rotates within threaded opening 60 and begins to couple fastener assembly 10 to nut 50. As stud 34 continues to rotate, threaded section 38 exits threaded opening 22 of retainer 20 until unthreaded section 42 of stud 34 rotates within threaded opening 22. As stud 34 continues to rotate, threaded section 40 pulls nut 50 toward fastener assembly 10, thereby securing outer panel 70 to inner panel 72. In this installed position, stud 34 is locked in place as detents 56 locate within channels 58 of boss 36. Additionally, locking threads within nut 50 may further prevent unwanted rotation of stud 34.

When it is desired to remove outer panel 70 from inner panel 72, the rotation of stud 34 may be reversed using wrench 82 to create sufficient torque to overcome the spring force of spring fingers 24, 26. As stud 34 rotates within threaded opening 60 of nut 50, stud 34 travels axially toward threaded hole 22 of retainer 20. Once threaded section 38 reaches threaded opening 22, threaded section 38 rotates within threaded opening 22 to completely withdraw threaded section 40 from threaded opening 60 of nut 50, thereby allowing outer panel 70 to be removed from inner panel 72.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications or embodiments.

What is claimed is:
1. A fastener assembly comprising:
a plate member having an opening and a pair of receivers;

a retainer having a threaded opening, a pair of oppositely disposed spring fingers and a pair of oppositely disposed hooks, the hooks lockably insertable within the receivers of the plate member to form a fastener housing; and a stud having a boss and first and second threaded sections extending in opposite directions from the boss, the stud rotatably positionable within the fastener housing, the stud having an uninstalled position wherein the first threaded section is threadably engaged with the threaded opening of the retainer and an installed position wherein the second threaded section extends outwardly through the opening of the plate member and the boss is locked between the spring fingers.

2. The fastener assembly as recited in claim 1 wherein the plate member further comprises a pair of oppositely disposed bent sections.

3. The fastener assembly as recited in claim 2 wherein the receivers are formed in the bent sections.

4. The fastener assembly as recited in claim 1 wherein the plate member further comprises a pair of rivet holes.

5. The fastener assembly as recited in claim 1 wherein the spring fingers of the retainer are angled such that the distance between the spring fingers proximate the plate member is less than the distance between the spring fingers proximate the threaded opening of the retainer.

6. The fastener assembly as recited in claim 1 wherein the spring fingers of the retainer further comprise detents.

7. The fastener assembly as recited in claim 1 wherein the hooks of the retainer further comprise bent sections.

8. The fastener assembly as recited in claim 1 wherein the stud further comprises an unthreaded section extending beyond the first threaded section.

9. The fastener assembly as recited in claim 1 wherein the boss of the stud further comprises a plurality of channels into which the spring fingers locate when the stud is in the installed position.

10. The fastener assembly as recited in claim 1 wherein the stud further comprises a hollow stud having a tool receiving pattern cut internally therein proximate the end of the second threaded section.

11. A method for securing two panels together comprising the steps of:

securing a nut to the first panel;

securing a plate member having an opening and a pair of receivers to the second panel;

coupling a retainer having a threaded opening, a pair of oppositely disposed spring fingers and a pair of oppositely disposed hooks to the plate member by lockably inserting the hooks within the receivers of the plate member to form a fastener housing;

rotatably positioning a stud having a boss and first and second threaded sections extending in opposite directions from the boss within the fastener housing; and rotating the stud from an uninstalled position wherein the first threaded section is threadably engaged with the threaded opening of the retainer to an installed position wherein the second threaded section extends outwardly through the opening of the plate member into threaded engagement with the nut and the boss is locked between the spring fingers, thereby securing the two panels together.

12. The method as recited in claim 11 wherein the step of securing a nut to the first panel further comprises riveting the nut to the first panel.

13. The method as recited in claim 11 wherein the step of securing a plate member to the second panel further comprises riveting the plate member to the second panel.

14. The method as recited in claim 11 further comprising the step of angling the spring fingers such that the distance between the spring fingers proximate the plate member is less than the distance between the spring fingers proximate the threaded opening of the retainer.

15. The method as recited in claim 11 wherein the step of rotating the stud from an uninstalled position to an installed position further comprises locating detents of the spring fingers within channels in the boss to lock the stud in the installed position.

16. The method as recited in claim 11 wherein the step of rotating the stud from an uninstalled position to an installed position further comprises disposing an unthreaded section extending beyond the first threaded section of the stud within the threaded opening of the retainer.

17. The method as recited in claim 11 wherein the step of rotating the stud from an uninstalled position to an installed position further comprises positioning a tool within an tool receiving pattern cut internally into the stud proximate the end of the second threaded section.

18. A fastener assembly comprising:

a plate member having an opening and a pair of receivers;

a retainer having a threaded opening, a pair of oppositely disposed spring fingers having detents and a pair of oppositely disposed hooks, the hooks lockably insertable within the receivers of the plate member to form a fastener housing; and a stud having a boss with channels, first and second threaded sections extending in opposite directions from the boss and an unthreaded section extending beyond the first threaded section, the stud rotatably positionable within the fastener housing, the stud having an uninstalled position wherein the first threaded section is threadably engaged with the threaded opening of the retainer and an installed position wherein the second threaded section extends outwardly through the opening of the plate member, the detents of the spring fingers are located within the channels of the boss and the unthreaded section of the stud is disposed within the threaded opening of the retainer.

19. The fastener assembly as recited in claim 18 wherein the spring fingers of the retainer are angled such that the distance between the spring fingers proximate the plate member is less than the distance between the spring fingers proximate the threaded opening of the retainer.

20. The fastener assembly as recited in claim 18 wherein the stud further comprises a hollow stud having a tool receiving pattern cut internally therein proximate the end of the second threaded section.

* * * * *